(12) United States Patent
Creemer

(10) Patent No.: US 7,536,190 B1
(45) Date of Patent: *May 19, 2009

(54) PROVIDING CONTENT BASED ON USER-SPECIFIC INFORMATION FROM A WIRELESS DEVICE

(75) Inventor: David Z. Creemer, Palo Alto, CA (US)

(73) Assignee: Palm, Inc., Sunnyvale, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 11/449,001

(22) Filed: Jun. 6, 2006

Related U.S. Application Data

(63) Continuation of application No. 10/917,182, filed on Aug. 11, 2004, now Pat. No. 7,103,370, which is a continuation of application No. 09/755,784, filed on Jan. 5, 2001, now Pat. No. 6,795,710.

(51) Int. Cl.
H04M 1/00 (2006.01)

(52) U.S. Cl. .............. 455/456.3; 455/456.6; 455/550.1; 455/556.2; 342/357.06

(58) Field of Classification Search .............. 455/456.1, 455/457, 404.2, 550.1, 556.2, 566, 418, 414.1; 342/357.06–357.09, 450; 709/217–218, 709/229; 701/200–201, 207
See application file for complete search history.

(56) References Cited

U.S. PATENT DOCUMENTS

| | | | |
|---|---|---|---|
| 6,011,976 A | 1/2000 | Michaels et al. | |
| 6,343,317 B1 | 1/2002 | Glorikian | |
| 6,452,498 B2 | 9/2002 | Stewart | |
| 6,484,033 B2 | 11/2002 | Murray | |
| 6,526,268 B1 | 2/2003 | Marrah et al. | |
| 6,529,159 B1 | 3/2003 | Fan et al. | |
| 6,546,257 B1 * | 4/2003 | Stewart | 455/456.3 |
| 6,571,279 B1 | 5/2003 | Herz et al. | |
| 6,650,902 B1 | 11/2003 | Richton | |
| 6,795,710 B1 * | 9/2004 | Creemer | 455/456.3 |
| 7,089,264 B1 | 8/2006 | Guido et al. | |
| 7,103,370 B1 * | 9/2006 | Creemer | 455/456.3 |
| 7,424,447 B2 | 9/2008 | Fuzell-Casey et al. | |
| 2002/0069093 A1 | 6/2002 | Stanfield | |
| 2002/0077130 A1 | 6/2002 | Owensby | |
| 2002/0087401 A1 | 7/2002 | Leapman et al. | |
| 2002/0103693 A1 | 8/2002 | Bayer et al. | |

(Continued)

FOREIGN PATENT DOCUMENTS

EP 1 220 552 A1 7/2002

OTHER PUBLICATIONS

U.S. Appl. No. 61/140,562, filed Dec. 23, 2008, Colligan et al.

(Continued)

Primary Examiner—Kamran Afshar
(74) Attorney, Agent, or Firm—Foley & Lardner LLP

(57) ABSTRACT

A system and method of targeting services according to information derived from a wireless transceiver device comprises accessing a rate of travel calculated for the wireless transceiver device, accessing a direction of travel calculated for the wireless transceiver device, accessing user-specific information resident in a memory unit located on the wireless transceiver device and providing content based on the user-specific information, the rate of travel and the direction of travel.

24 Claims, 9 Drawing Sheets

U.S. PATENT DOCUMENTS

| | | |
|---|---|---|
| 2003/0008661 A1 | 1/2003 | Joyce et al. |
| 2003/0013456 A1 | 1/2003 | Bates et al. |
| 2003/0060211 A1 | 3/2003 | Chern |
| 2003/0060214 A1 | 3/2003 | Hendrey et al. |
| 2003/0159109 A1 | 8/2003 | Rossmann et al. |
| 2006/0197781 A1 | 9/2006 | Arutunian |
| 2006/0200308 A1 | 9/2006 | Arutunian |
| 2006/0200311 A1 | 9/2006 | Arutunian et al. |
| 2006/0200382 A1 | 9/2006 | Arutunian et al. |
| 2006/0200383 A1 | 9/2006 | Arutunian et al. |
| 2006/0200384 A1 | 9/2006 | Arutunian et al. |
| 2008/0059285 A1 | 3/2008 | Hamoui |

OTHER PUBLICATIONS

U.S. Appl. No. 12/324,694, filed Nov. 26, 2008, Colligan et al.
U.S. Appl. No. 12/324,678, filed Nov. 26, 2008, Colligan et al.
U.S. Appl. No. 11/901,272, filed Sep. 14, 2007, Kansal et al.
U.S. Appl. No. 10/917,182, filed Aug. 11, 2004, Creemer, David Z.
U.S. Appl. No. 09/755,784, filed Jan. 5, 2001, Creemer, David Z.

* cited by examiner

PROVIDING CONTENT BASED ON USER-SPECIFIC INFORMATION FROM A WIRELESS DEVICE

CROSS REFERENCE TO RELATED APPLICATIONS

This application is a Continuation Application of the commonly-owned U.S. patent application with Ser. No. 10/917,182, filed Aug. 11, 2004, now U.S. Pat. No. 7,103,370 by D. Creemer, and entitled "Identifying Client Patterns Using Online Location-Based Derivative Analysis," which in turn is a Continuation Application of Ser. No. 09/755,784 now U.S. Pat. No. 6,795,710, filed Jan. 5, 2001, by D. Creemer, and entitled "Identifying Client Patterns Using Online Location-Based Derivative Analysis."

BACKGROUND OF THE INVENTION

1. Field of the Invention

The present invention relates to the field of wireless transceiver devices. Specifically, the present invention relates to a method and system for targeting services according to location-based information derived from a wireless transceiver device.

2. Related Art

The use of wireless technologies for communication is becoming more popular. In addition to personal cordless telephones (e.g., cell phones) and pagers, computer systems (in particular, handheld or portable computer systems including personal digital assistants) are more commonly being equipped with transceivers capable of broadcasting wireless signals (e.g., radio signals) over relatively long distances. These wireless communication devices provide users with greater mobility and convenience, and hence are becoming more widely used.

Cellular network providers generally track the locations of cell phones in order to complete incoming calls. In addition, many cell phones have, or will have, the capability to identify their position to dispatchers for emergency situations in which a "911" call is made. Cell phone capabilities are being added to a number of other types of devices including personal digital assistants (PDAs), thereby allowing the position of these devices to also be determined. Other types of wireless communication devices may be equipped with Global Positioning System (GPS) capability allowing their locations to be pinpointed. In any case, users of wireless communication devices can often be located to an acceptable degree of accuracy.

As a result, in addition to more conventional uses, wireless communication devices provide commercial enterprises (e.g., merchants) with opportunities to offer services directly to users (e.g., advertise). For instance, advertisers and the like may use location-based information received from a wireless communication device to establish the location of the device and to imply the location of the user. Other user information can come from other wireless data. Based on the location of the device and the other user information, an appropriate service can be identified and communicated to the user.

For example, when the user is determined to be in the vicinity of a particular merchant, a message can be sent to that user advertising that merchant. Most wireless communication devices have some sort of display capability allowing the message conveying the advertisement to be displayed to the user. PDAs and other such devices typically have even greater display capabilities relative to cell phones and the like.

Thus, in some instances, advertisers and other service providers try to target their advertisements according to the location of the individual user, in order to make the advertisement more relevant and valuable to that user. However, a problem with the prior art paradigm is that, while the advertisement may appear to be targeted to the user based on the user's location, in actuality it may not be. For example, the user may appear to be in the vicinity of a particular merchant but actually may be only passing by while riding on a train, with no opportunity to disembark from the train in order to patronize the merchant. As such, an advertisement for that merchant is of little or no interest to the user. Not only is the advertisement itself wasted, but the opportunity to provide a more relevant advertisement is also lost.

Therefore, what is needed is a system and/or method that can more effectively target advertisements and other services to users of wireless communication devices. The present invention provides this advantage and others not specifically mentioned above but described in the sections to follow.

SUMMARY OF THE INVENTION

The present invention provides a method and system thereof that can be used to more effectively target advertisements and other services to users of wireless communication devices. The present invention pertains to a method and system thereof for targeting content and services (e.g., an advertisement) according to location-based information derived from a mobile wireless transceiver device. In one embodiment, position information as a function of time is used to calculate a rate of travel and a direction of travel. This information can also be used to identify a likely mode of transportation. In another embodiment, geographical information can be used to further refine the mode of transportation. The rate and direction of travel and/or the likely mode of transportation can be considered, along with other information described below, to identify content or services more precisely targeted to the user's circumstances.

The present invention can be implemented on the wireless transceiver device itself, on a portable computer system (e.g., a palmtop or personal digital assistant) coupled to the wireless transceiver device, or on a computer system (e.g., a server computer system) communicatively coupled to the wireless transceiver device.

In one embodiment, position and time information indicating the positions of the wireless transceiver device as a function of time are used to calculate rate-based information, such as a rate of travel, and direction-based information, such as a direction of travel. The rate-based information and the direction-based information can be used by a service provider to more precisely target content (e.g., a service or advertisement) according to the circumstances of the user.

In another embodiment, the rate of travel is used to make an intelligent selection of a likely mode of transportation (e.g., whether the user is walking or traveling by vehicle). The likely mode of transportation can also be used to further improve the targeting of the content.

In yet another embodiment, the rate of travel and the direction of travel are correlated to geographical information in a database to further refine the selection of the likely mode of transportation. For example, the geographical database can be used to determine whether the user is on a highway or on a rail line, thereby indicating whether the user is traveling by automobile or by train. Thus, additional precision can be provided for targeting the service or advertisement.

Furthermore, in another embodiment, the rate of travel and the direction of travel can be used to predict a future position for the user, so that a service or advertisement can be targeted accordingly.

In yet another embodiment, an historical record of the rate-position information and/or the mode of transportation can be generated and maintained for each user and/or device. The historical record can also be factored into the selection of content to be provided.

In still another embodiment, information stored on the wireless communication device is used to further refine the targeting of an advertisement or service. For example, in a portable computer system, users often store key dates such as birthdays and the like. This type of information can be used along with the rate-based and direction-based information to target an appropriate service or advertisement.

Thus, in addition to the position of the wireless transceiver devices, factors such as the rate of travel, the direction of travel and the likely mode of transportation can also be considered in order to more precisely identify an appropriate service or advertisement. Moreover, a potential destination can be predicted, allowing further refinement of the targeted content.

These and other objects and advantages of the present invention will become obvious to those of ordinary skill in the art after having read the following detailed description of the preferred embodiments which are illustrated in the various drawing figures.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sending" or "receiving" or "providing" or "calculating" or "identifying" or "correlating" or "maintaining" or "sampling" or "reading" or "using" or the like, refer to the action and processes of a computer system (e.g., process 800 of FIG. 8), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Portable Computer System Communication Network

Figure 1:
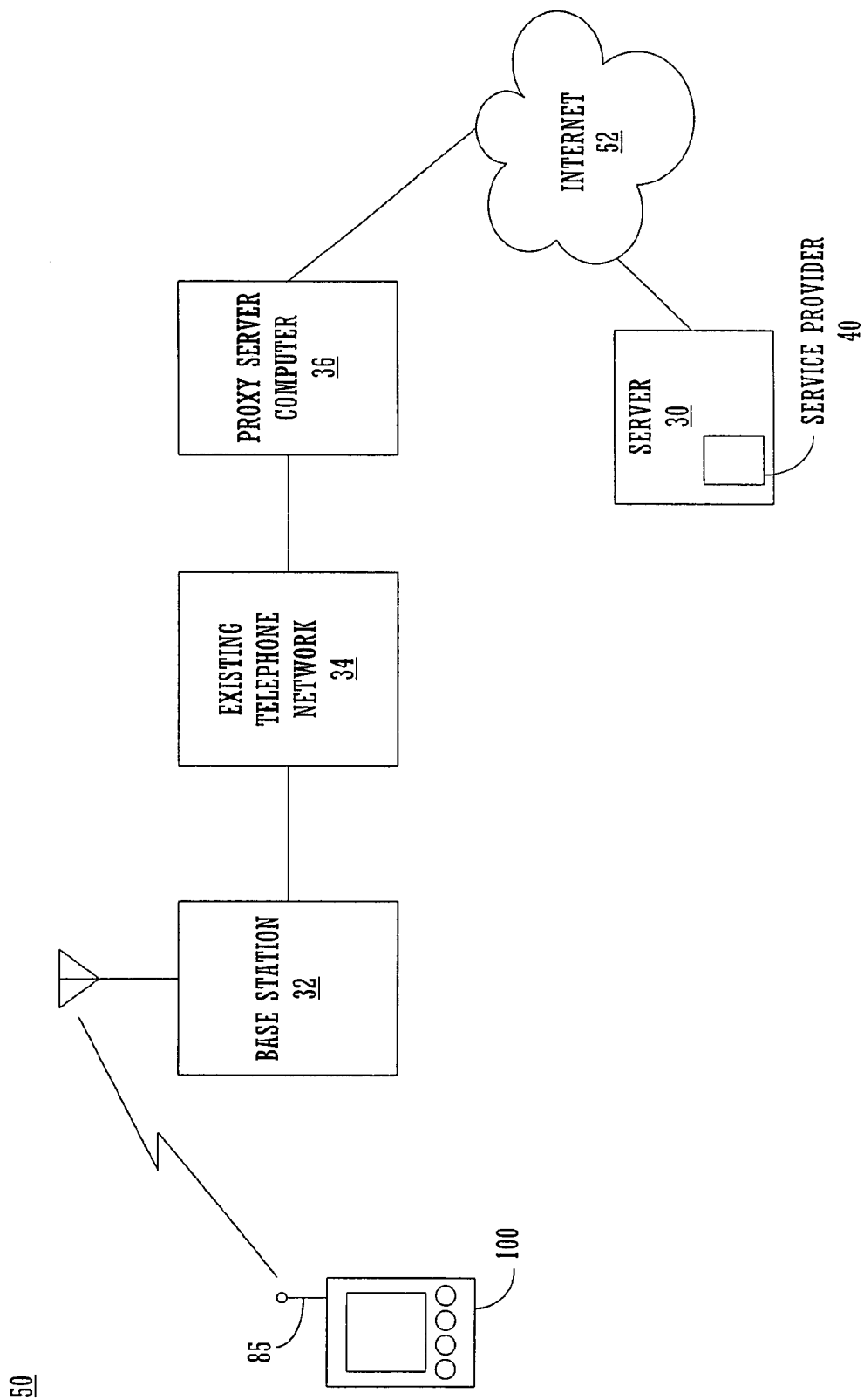
FIG. 1 is a block diagram of an exemplary communications network including a portable computer system with wireless communication capability in accordance with one embodiment of the present invention.

FIG. 1 is a block diagram of an exemplary communications network 50 including a portable computer system with wireless communication capability in accordance with one embodiment of the present invention. Portable computer system 100 is also known as a palmtop, hand-held or palm-sized computer system or personal digital assistant (PDA).

In the present embodiment, portable computer system 100 has the ability to transmit and receive data and information over a wireless communication interface (e.g., a radio interface). In one embodiment, the wireless communication interface is integrated into portable computer system 100; in another embodiment, the wireless communication interface is accomplished with a wireless modem attachment (not shown). Wireless signals are transmitted and received by portable computer system 100 using antenna 85.

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52.

Coupled with Internet 52 are multiple servers exemplified by server 30. Residing on server 30 is an agent or application operated by service provider 40. Service provider 40, in one embodiment, provides services associated with identifying client patterns using location-based information and for targeting services to users based on their location, rate of travel, direction of travel, as well as other information. Additional information is provided in conjunction with FIG. 8, below.

It should be further appreciated that other embodiments of a communications network, planned or envisioned, may be utilized in accordance with the present invention. For example, a wireless connection may be made from portable computer system 100 via antenna 85 directly to the Internet 52.

The data and information which are communicated between base station 32 and portable computer system 100 via antenna 85 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

Exemplary Portable Computer System with Wireless Transceiver

Figure 2:
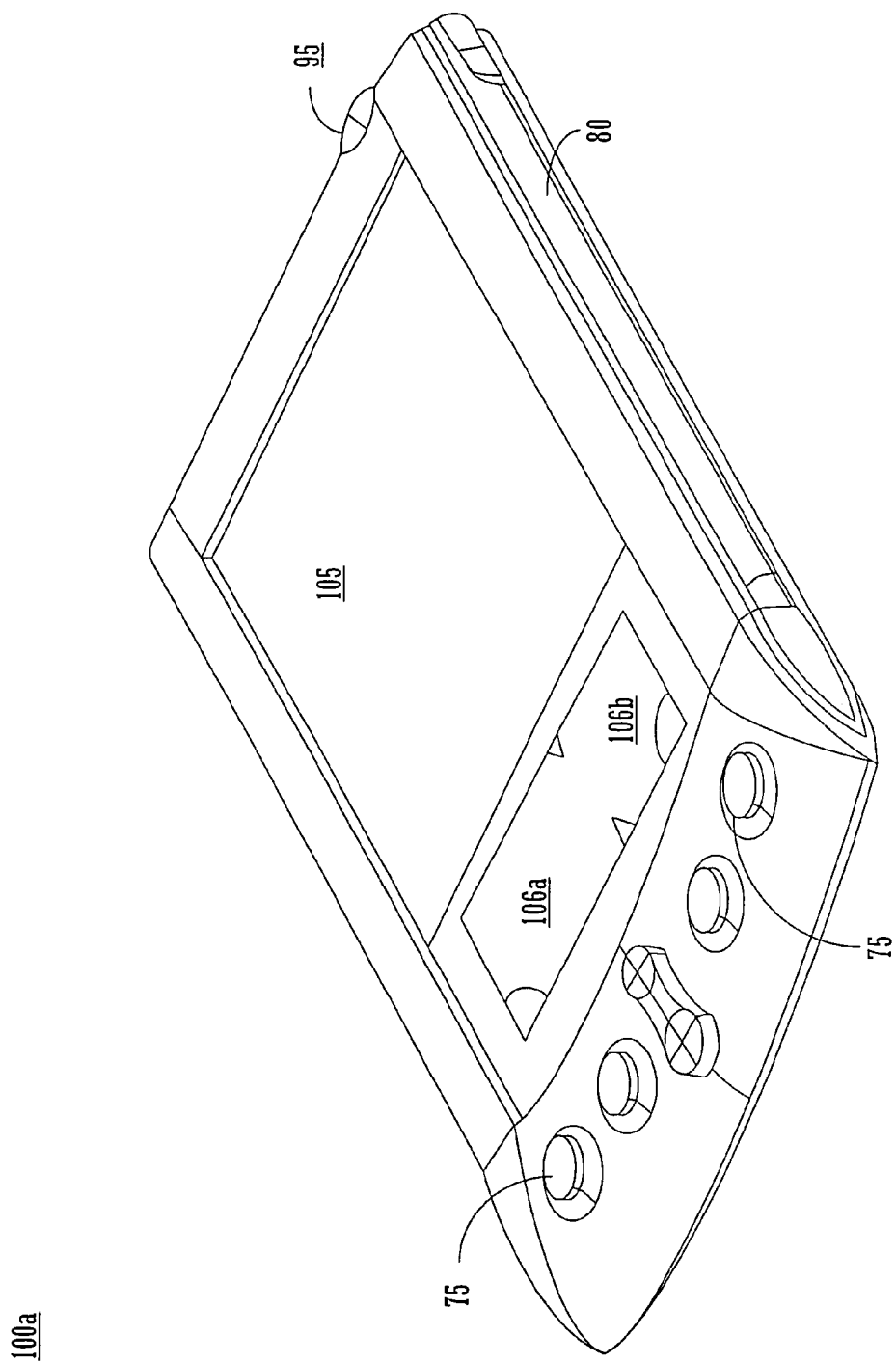
FIG. 2 is a top side perspective view of a portable computer system in accordance with one embodiment of the present invention.

FIG. 2 is a perspective illustration of the top face 100a of one embodiment of the portable computer system 100 of the present invention. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
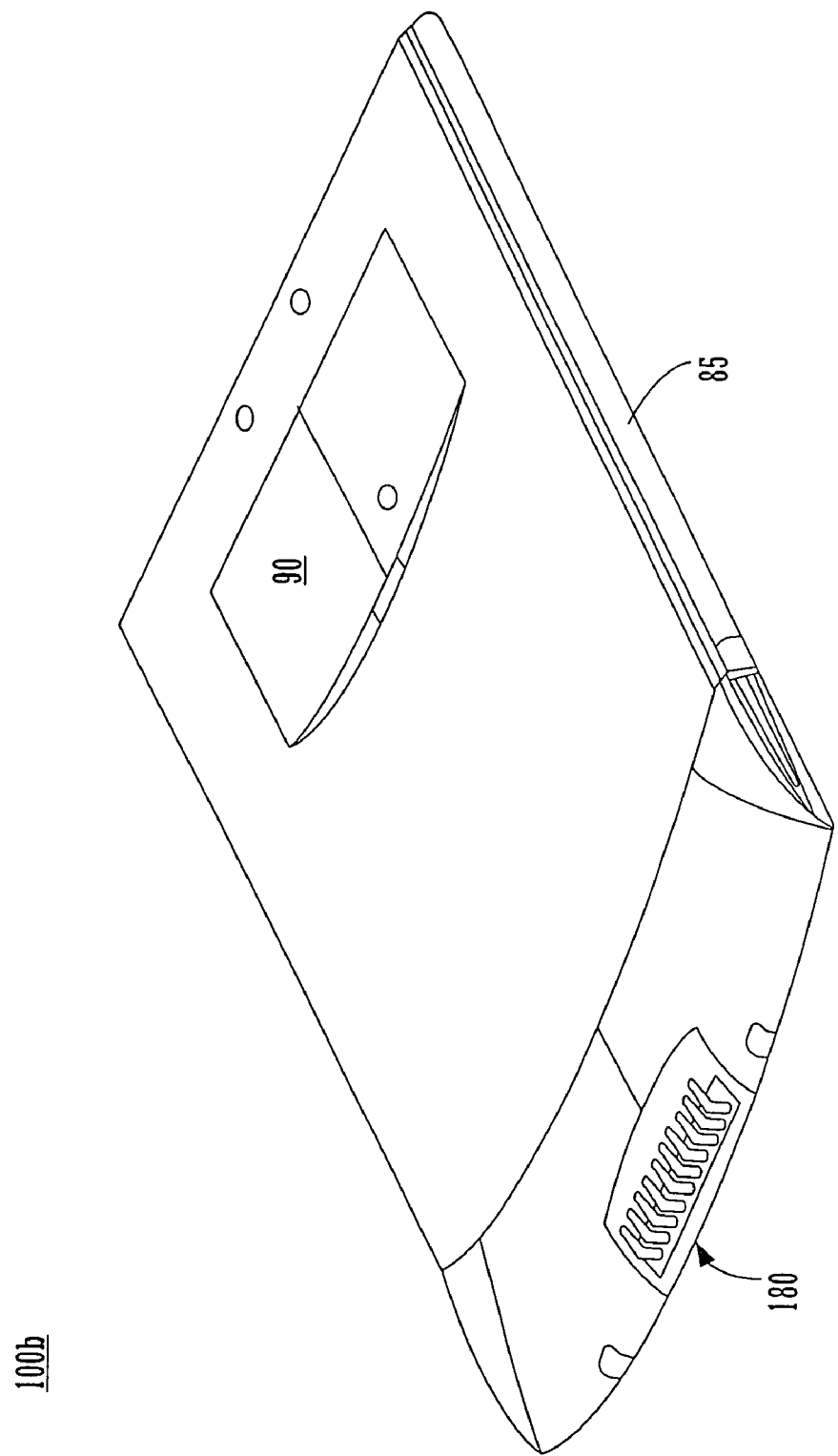
FIG. 3 is a bottom side perspective view of the portable computer system of FIG. 2.

FIG. 3 illustrates the bottom side 100b of one embodiment of the portable computer system 100 that can be used in accordance with various embodiments of the present invention. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc. An antenna 85 and a battery storage compartment door 90 are shown.

Figure 4:
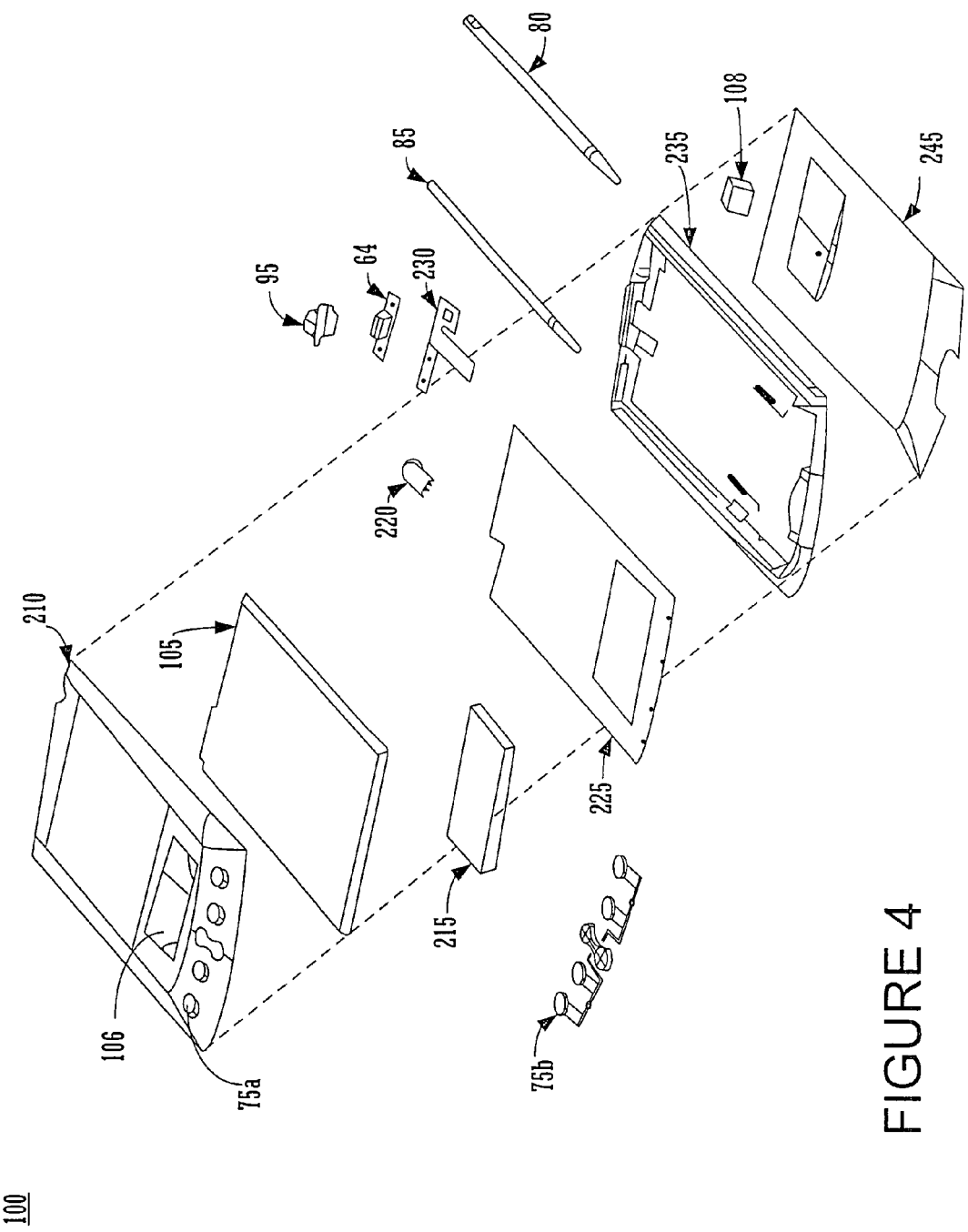
FIG. 4 is an exploded view of the components of the portable computer system of FIG. 2.

FIG. 4 is an exploded view of the portable computer system 100 in accordance with one implementation. Portable computer system 100 contains a back cover 245 and a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A mid-frame 235 is shown along with stylus 80. Position-adjustable antenna 85 is also shown.

Infrared communication mechanism 64 (e.g., an infrared emitter and detector device) is for sending and receiving information from other similarly equipped devices. A signal (e.g., radio) receiver/transmitter device 108 is also shown. The receiver/transmitter device 108 is coupled to the antenna 85 and also coupled to communicate with the PC board 225. In one implementation, the Mobitex wireless communication system is used to provide two-way communication between portable computer system 100 and other computers and/or the Internet via a proxy server (see FIG. 1).

Figure 5A:
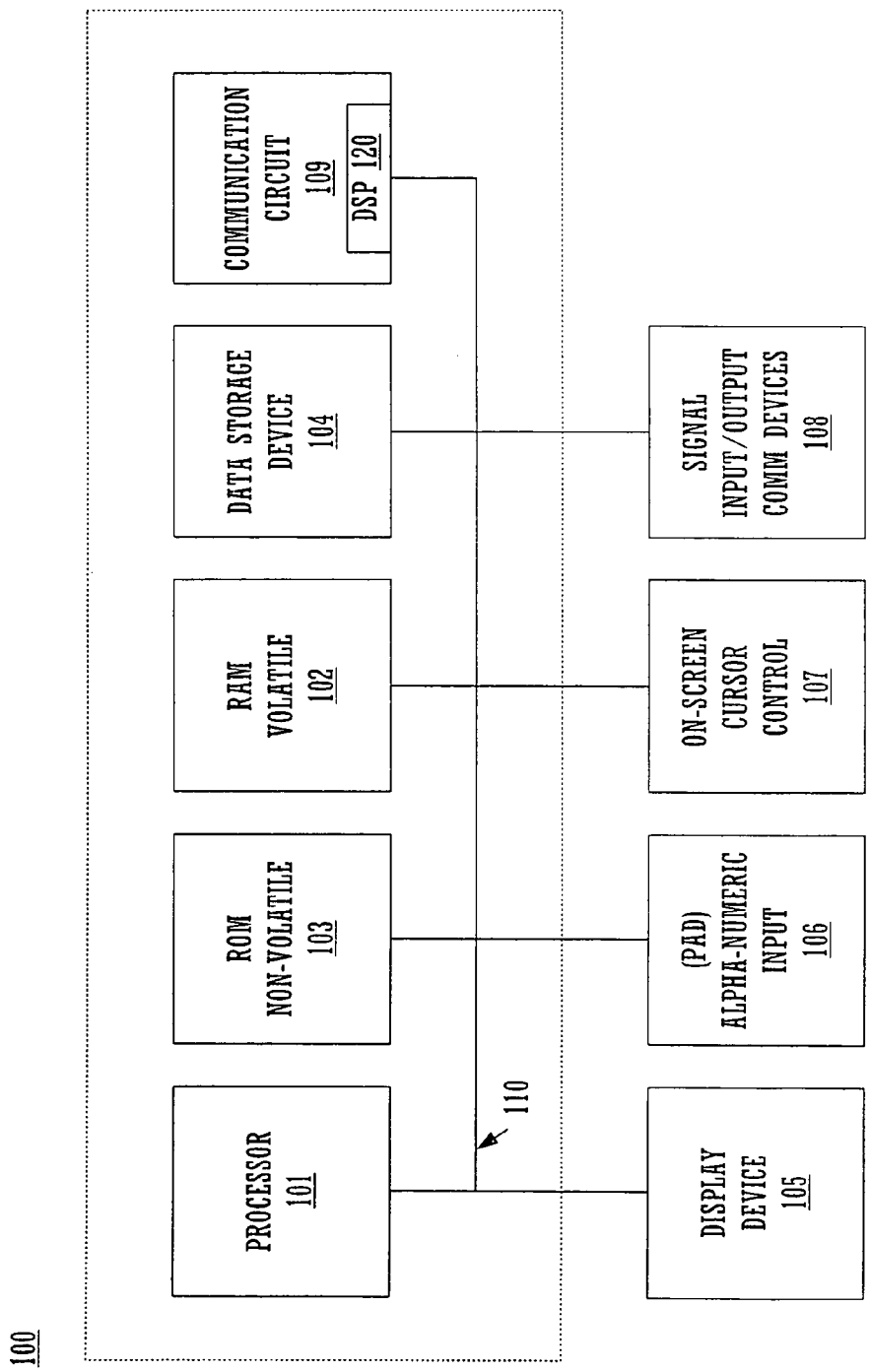
FIG. 5A is a block diagram of one embodiment of a portable computer system in accordance with the present invention.

FIG. 5A is a block diagram of the circuitry of an exemplary portable computer system 100 upon which embodiments of the present invention may be practiced. In the present embodiment, portable computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Portable computer system 100 also includes an optional data storage device 104 (e.g., memory stick) coupled with the bus 110 for storing information and instructions. Data storage device 104 can be removable. As described above, portable computer system 100 also contains a display device 105 coupled to the bus 110 for displaying information to the computer user. In a portable computer system 100, PC board 225 can contain the processor 101, the bus 110, the ROM 103 and the RAM 102.

With reference still to FIG. 5A, in the present embodiment, portable computer system 100 also includes a signal transmitter/receiver device 108, which is coupled to bus 110 for providing a physical communication link between portable computer system 100 and a communication network (e.g., wireless communication network 50 of FIG. 1). As such, signal transmitter/receiver device 108 enables portable computer system 100 to communicate wirelessly with other electronic systems coupled to the communication network.

It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, portable computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

In one embodiment, portable computer system 100 includes an optional alphanumeric input device 106 that in one implementation is a handwriting recognition pad ("digitizer") having regions 106a and 106b (FIG. 2), for instance. Alphanumeric input device 106 can communicate information and command selections to processor 101. Portable computer system 100 can also include an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with portable computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 5B:
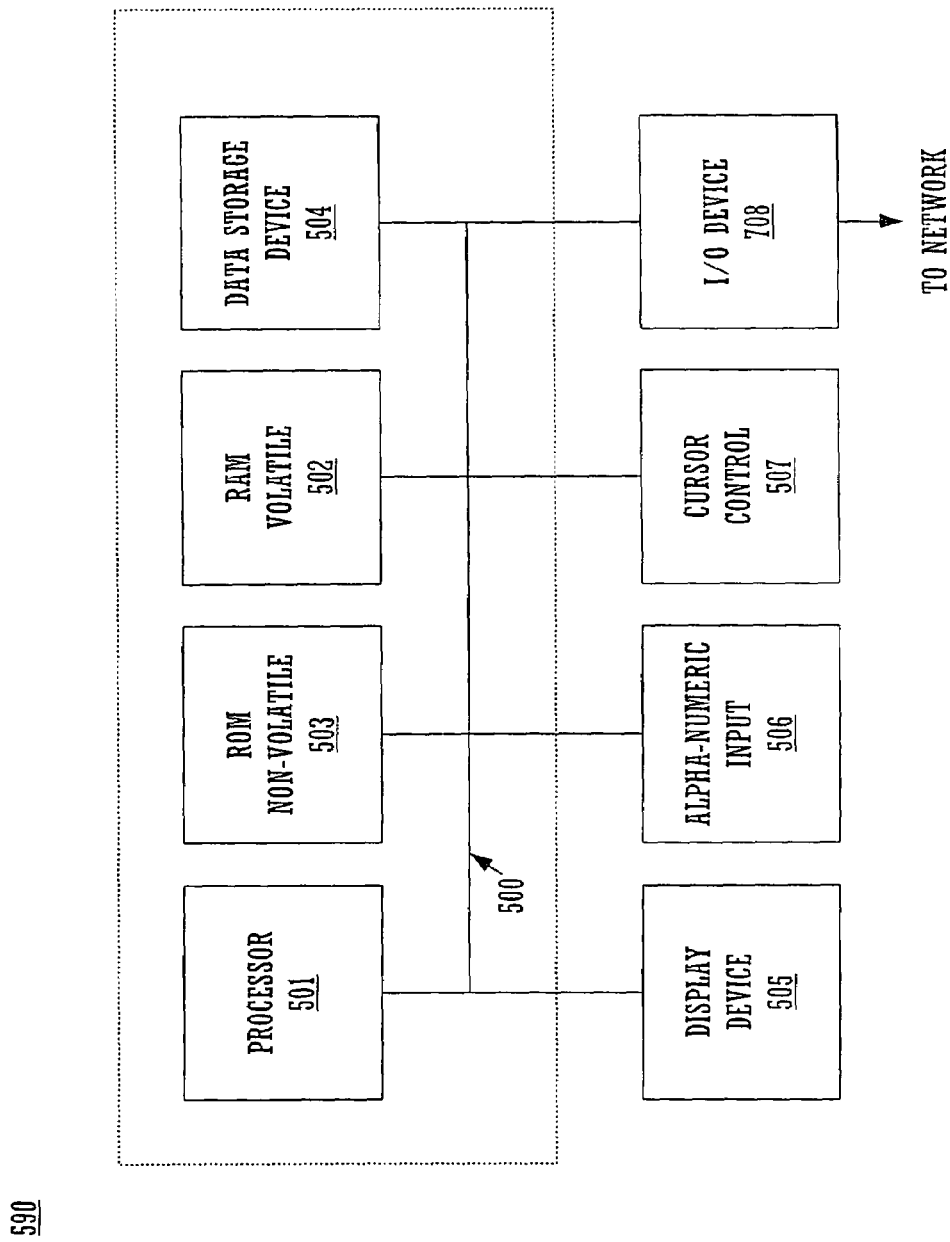
FIG. 5B is a block diagram of one embodiment of a server computer system in accordance with the present invention.

Refer now to FIG. 5B which illustrates an exemplary computer system 590 upon which embodiments of the present invention may be practiced. In the present embodiment, computer system 590 exemplifies server 30 of FIG. 1. In general, computer system 590 comprises bus 500 for communicating information, processor 501 coupled with bus 500 for processing information and instructions, random access (volatile) memory (RAM) 502 coupled with bus 500 for storing information and instructions for processor 501, read-only (nonvolatile) memory (ROM) 503 coupled with bus 500 for storing static information and instructions for processor 501, data storage device 504 such as a magnetic or optical disk and disk drive coupled with bus 500 for storing information and instructions, an optional user output device such as display device 505 coupled to bus 500 for displaying information to the computer user, an optional user input device such as alphanumeric input device 506 including alphanumeric and function keys coupled to bus 500 for communicating information and command selections to processor 501, and an optional user input device such as cursor control device 507 coupled to bus 500 for communicating user input information and command selections to processor 501. Furthermore, an input/output (I/O) device 508 is used to couple computer system 590 onto, for example, a network (e.g., Internet 52).

Exemplary Wireless Communication System and Device

Figure 6:
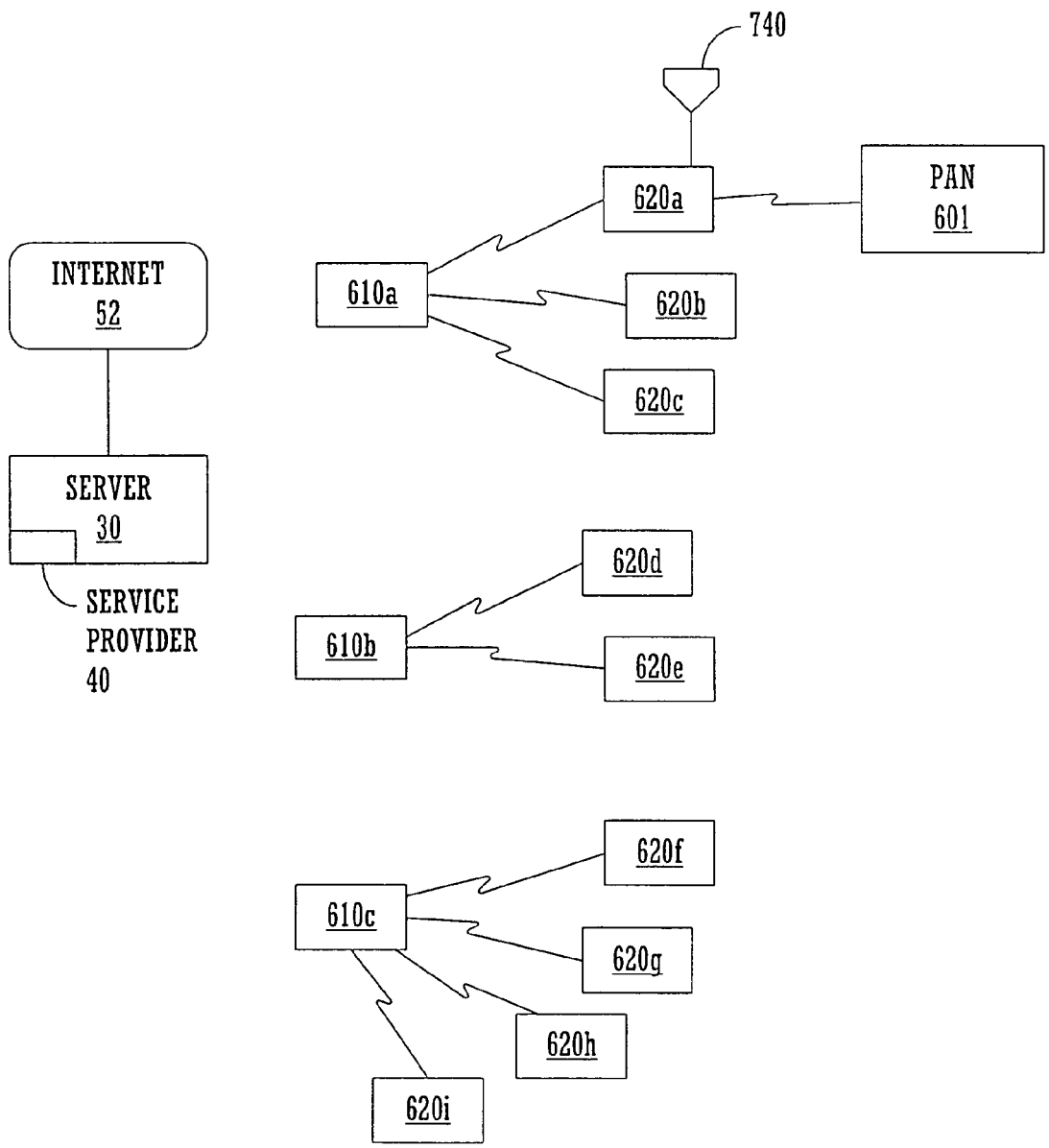
FIG. 6 provides a general overview of a wireless communication system in accordance with one embodiment of the present invention.

FIG. 6 provides a general overview of a wireless communication system 600 in accordance with one embodiment of the present invention. Communication system 600 consists of a family of base stations 610a, 610b and 610c (e.g., cells) that are geographically distributed over the service area. Communication system 600 also includes a plurality of subscriber stations (e.g., transceivers 620a-620i). Communication system can be coupled to a standard telephone wire system (not shown).

Each of transceivers 620a-620i is exemplified as a mobile station such as a personal cordless telephone, a pager, or a computer system with a wireless modem; however, a subscriber station may also be in a relatively fixed location, such as a conventional computer system with a wireless modem or the like.

Wireless communication is established between a base station (e.g., base station 610a) and a subscriber station (e.g., transceiver 620a) using well-known techniques. Communication can occur using multipath signals from base station 610a to transceiver 620a. Wireless signals are transmitted and received by transceiver 620a using antenna 740.

In one embodiment, transceiver 620a is communicatively coupled to other devices in a personal area network (PAN) 601 using wireless connections such as Bluetooth. Each of the devices in PAN 601 can be in communication with each other. Typically, PAN 601 comprises mobile devices with which a user can travel with relative ease, such as PDAs (e.g., portable computer system 100 of FIG. 5), cell phones, and pagers. However, the devices in PAN 601 can include printers, desktop computer systems, fax machines, and laptop computer systems as well as PDAs, cell phones, and pagers.

A message received by one device in PAN 601 can be communicated to the other devices in the personal area networks. Similarly, when the location of one of the devices in PAN 601 is known, the locations of the other devices in the personal area network is also known with reasonable certainty.

In one embodiment, base station 610a enables a wireless connection from transceiver 620a to Internet 52, and then to server 30 and service provider 40 (see also FIG. 1). It is appreciated that, alternatively, transceiver 620a may communicate directly with Internet 52, specifically server 30 and service provider 40, via a wireless connection. As mentioned above, residing on server 30 is an agent or application operated by service provider 40. Service provider 40, in one embodiment, provides services associated with identifying client patterns using location-based information and for targeting services to users based on their location, rate of travel, direction of travel, as well as other information. Additional information is provided in conjunction with FIG. 8, below.

Figure 7:
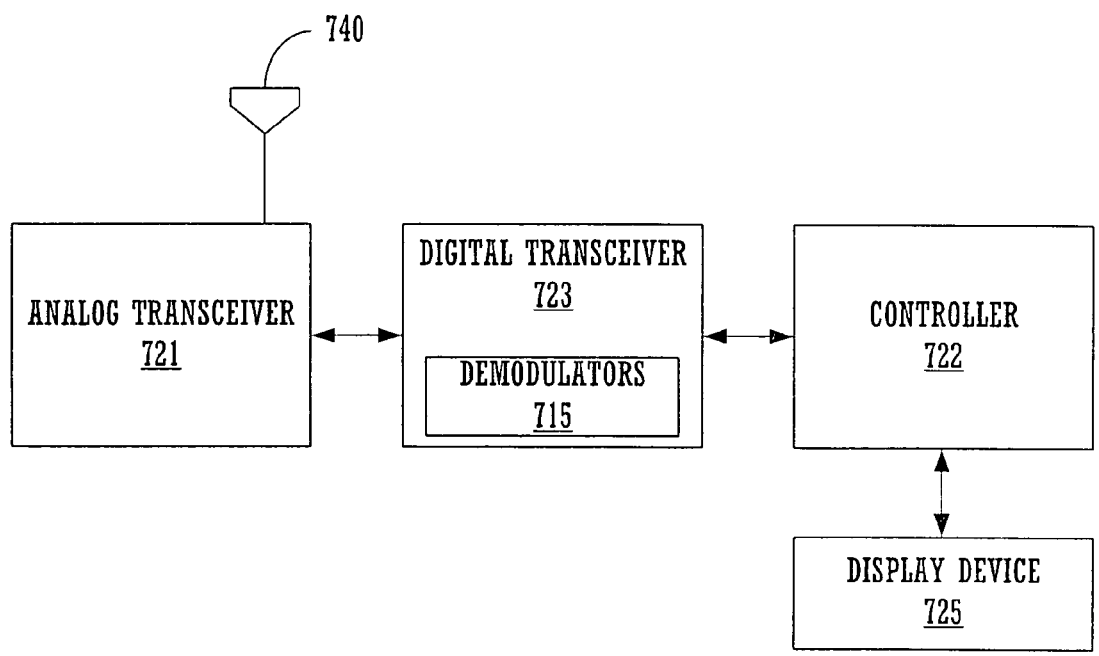
FIG. 7 illustrates the primary functional blocks in an exemplary transceiver in a wireless communication system in accordance with one embodiment of the present invention.

FIG. 7 illustrates the primary functional blocks in a subscriber station exemplified by transceiver 620a in accordance with one embodiment of the present invention. Analog transceiver 721 is used, for example, to receive the communication signal from base station 610a (FIG. 6) and convert it from an analog signal to a digital baseband signal. Controller 722 executes the control logic for transceiver 620a and consists of, for example, a central processing unit, a digital signal processor (if present), hardware control and associated software. Digital transceiver 723 contains the digital data processing elements such as demodulators 715. Antenna 740 is also shown.

Also shown is a display device 725. The display device 725 utilized with transceiver 620a may be a liquid crystal display device, a cathode ray tube (CRT), a field emission display device (also called a flat panel CRT) or other display device suitable for generating graphic images and alphanumeric characters recognizable to the user.

Figure 8:
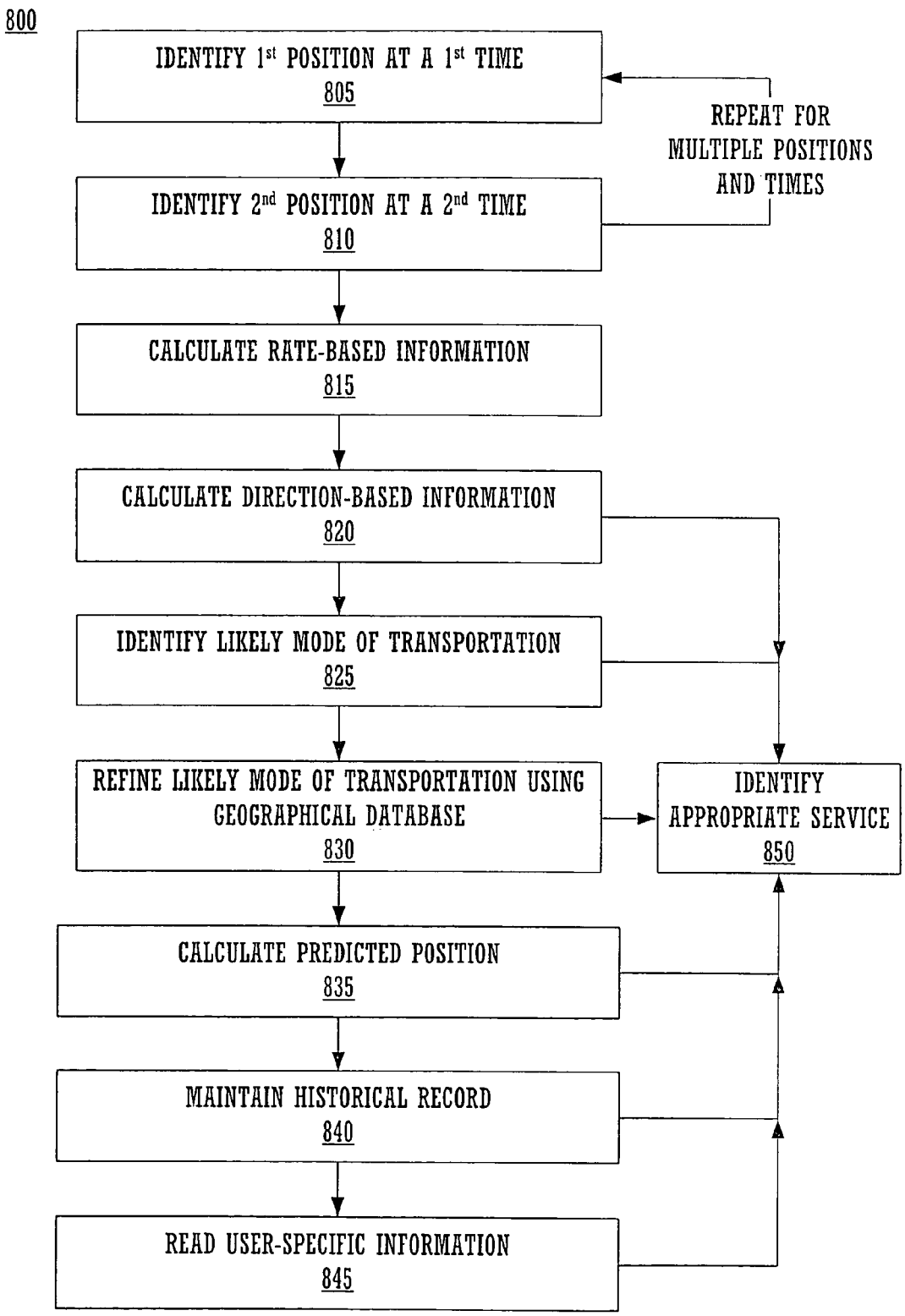
FIG. 8 is a flowchart of the steps in a process for targeting services according to location-based information derived from a wireless transceiver in accordance with one embodiment of the present invention.

Method for Identifying Client Patterns Using Online Location-Based Derivative Analysis FIG. 8 is a flowchart of the steps in a process 800 for targeting services according to location-based information derived from a wireless transceiver device in accordance with one embodiment of the present invention. In one embodiment, process 800 can be implemented via computer-readable program instructions stored in a memory unit (e.g., random access memory 102, read-only memory 103, and/or data storage device 104) and executed by processor 101 of portable computer system 100 (FIG. 5A). In another embodiment, process 800 can be implemented via computer-readable program instructions stored in a memory unit (e.g., random access memory 502, read-only memory 503, and/or data storage device 504) and executed by processor 501 of computer system 590 (FIG. 5B). In the latter embodiment, computer system 590 may be a server 30 (FIGS. 1 and 6) communicatively coupled to the wireless transceiver device.

In one embodiment, the wireless transceiver device may be incorporated into portable computer system 100 as shown by FIG. 5A. In another embodiment, the wireless transceiver device may be a cordless telephone, pager or the like as exemplified by transceiver 620a of FIG. 6. It is appreciated that other types of wireless transceiver devices may be used in accordance with the present invention. Furthermore, it is appreciated that the wireless transceiver device may be separate from but communicatively coupled to portable computer system 100 or transceiver 620a, such as in PAN 601 of FIG. 6.

In step 805 of FIG. 8, in the present embodiment, the position (location) of the wireless communication device (and hence the user) is identified at a first time. Mechanisms for identifying the location of the wireless communication device are known in the art. For example, cellular network providers generally track the locations of cell phones in order to complete incoming calls. In addition, many cell phones have, or will have, the capability to identify their position to dispatchers for emergency situations in which a "911" call is made. Cell phone capabilities are being added to a number of other types of devices including PDAs, thereby allowing the position of these devices to also be determined. Other types of wireless communication devices may be equipped with Global Positioning System (GPS) capability allowing their locations to be pinpointed. In any case, users of wireless communication devices can often be located to an acceptable degree of accuracy.

In one embodiment, the information indicating position and time is sent to computer system 590 of FIG. 5B (e.g., server 30 of FIGS. 1 and 6) from the wireless communication device. In another embodiment, the information indicating position and time is sent to portable computer system 100 from the wireless communication device. The position information may be sent from the wireless communication device to these devices on a relatively continuous basis, or the information may be stored by the wireless communication device and sampled by these devices at a scheduled time, or at specified time intervals.

In step 810 of FIG. 8, in the present embodiment, a second position of the wireless communication device is measured at a second time, in a manner similar to that described above for step 805. It is appreciated that steps 805 and 810 can be repeated on a continuous basis or at periodic intervals so that multiple positions at multiple times can be determined. As described above, the position and time information can be stored and then sent to portable computer system 100 or server 30 (e.g., computer system 590) at a later time, sampled at periodic intervals, or the information can be sent these devices on a relatively continuous basis.

In step 815, in the present embodiment, the position and time information from steps 805 and 810 is used to calculate rate-based information such as the user's rate of travel. The rate of travel can be calculated by dividing the distance traveled (the difference between two positions) by the amount of time taken to travel that distance (the difference between the times associated with those positions). Different sets of position and time information can be used to determine the rate of travel at different points along the user's path. An average rate of travel along different segments of the path, or for the overall journey, can be determined using either all of the position information or a sample thereof. The position and time information can also be evaluated using "best-fit" calculations.

In step 820 of the present embodiment, direction-based information, such as the direction of travel, is calculated using the position information from steps 805 and 810. In one embodiment, a best-fit algorithm is applied to all of the position information, or a sample thereof, to determine the direction of travel. In one embodiment, the time information is also used to determine direction as a function of time. As above, different sets of position and time information can be used to determine the direction of travel at different points along the user's path.

Together, the rate-based information from step 815 and the direction-based information from step 820 provide a "rate-position vector" indicating the user's rate and direction of travel along segments of the user's path, or for the overall journey. In one embodiment, the rate-based information and the direction-based information are used to provide content based on the rate and direction of travel (step 850, further described below).

In step 825, in one embodiment, the rate-based information (e.g., the rate of travel) is used to heuristically determine the likely mode of transportation; that is, whether the user is walking or traveling in some type of vehicle. A lookup table can be used to correlate rates of travel to likely modes of transportation. Thus, the present invention provides a means for intelligently selecting a mode of transportation which the user is likely to be using. In one embodiment, the rate-based information, the direction-based information and/or the likely mode of transportation are used to provide content based on the rate and direction of travel (step 850).

In step 830, in one embodiment, the rate-position vector (from step 820) can be correlated to geographical information in a database to narrow the mode of transportation to an even more likely choice. Databases containing geographical information, and the application of such databases to locating a user (e.g., on a map), are known in the art. In the present embodiment, by comparing the user's position, rate of travel and direction of travel to known infrastructures (e.g., highways, rail lines, etc.) in the geographical database, the user can be placed on a highway, on a railroad, or the like.

Accordingly, a more precise deduction can be made of the mode of transportation being used. In particular, what type of vehicle the user is riding in, such as an automobile or in a train, can be identified. In one embodiment, the rate-based information, the direction-based information and/or the refined choice for the likely mode of transportation are used as the basis for providing content (step 850).

In step 835, in the present embodiment, the rate of travel and direction of travel are used to estimate a prospective position of the user. In one embodiment, the likely mode of transportation is also factored in order to better predict the user's prospective position. In another embodiment, the user's prospective position at various times in the future is estimated. In one embodiment, the rate-based information, the direction-based information, the likely mode of transportation, and/or the estimated future position of the user are used as the basis for providing content (step 850).

In step 840 of FIG. 8, in one embodiment, an historical record for the wireless communication device (and its user) can be stored and updated. That is, the rate-position vector and mode of transportation can be determined over a period of time and stored in a memory unit of either portable computer system 100 (FIG. 5A) or computer system 590 (FIG. 5B). The historical record can be uniquely associated with the user and/or with the wireless transceiver device. The historical record can then also be factored into the selection of content to be provided (step 850).

In step 845 of FIG. 8, in one embodiment, user-specific information is read from the wireless communication device and factored into the selection of an appropriate service (step 850). For example, many users record key dates in the memory unit of their portable computer systems. Information such as a birth date can be retrieved from memory and used to further specify an appropriate service in combination with the user's rate and direction of travel and/or likely mode of transportation.

Also, information stored in the address book of a portable computer system can be used to identify not only that an associate is nearby, but that it is possible to meet. The user's mode of transportation, direction of travel, rate of travel, and predicted position, as well as similar information for the user's associate, can be correlated to determine whether a meeting is possible. That is, in accordance with the present invention, it is possible to determine the difference between whether the user and the associate are both walking to a common point, or whether they are passing in opposite directions on different sides of a highway.

In step 850, in the present embodiment, the content provided includes services that are appropriate to the user's current circumstances, or the user's predicted circumstances. These services can be identified and communicated to the user via the wireless communication device (e.g., portable computer system 100 of FIG. 1, transceiver 620*a* of FIG. 6, or a device in PAN 601 of FIG. 6), and displayed to the user on that device. Conversely, services not appropriate to the user's circumstances can be identified and not sent to the user.

The content can include, but are not limited to, advertisements for merchants. It is appreciated that other information, in addition to the location-based information described above, can be factored into the selection of the appropriate content or service. For example, weather conditions, time of day, and the like can be considered to further refine the selection of the appropriate content or service.

In one embodiment, a user profile can be set up, either on portable computer system 100, transceiver 620*a*, or server 30 (FIGS. 1 and 6), to indicate user preferences for certain services, types of services, and the like. The information in the user profile can also be considered when selecting the appropriate service.

Thus, the present invention provides a device and method that can be used to more effectively target advertisements and other services to users of wireless communication devices. By considering other factors beyond simply the user's location, such as the user's rate of travel, direction of travel, and mode of transportation, a much more fine-grained targeting of services and advertisements is possible.

The preferred embodiment of the present invention, identifying client patterns using online location-based derivative analysis, is thus described. While the present invention has been described in particular embodiments, it should be appreciated that the present invention should not be construed as limited by such embodiments, but rather construed according to the below claims.

What is claimed is:

1. A method of targeting services according to information derived from a wireless transceiver device, said method comprising:
   accessing a rate of travel calculated for said wireless transceiver device;
   accessing a direction of travel calculated for said wireless transceiver device;
   accessing user-specific information resident in a memory unit located on said wireless transceiver device; and
   providing content based on said user-specific information, said rate of travel and said direction of travel.

2. The method as recited in claim 1 comprising:
   identifying a likely mode of transportation using said rate of travel; and
   providing content based on said user-specific information, said direction of travel and said mode of transportation.

3. The method as recited in claim 1 comprising:
   correlating said rate of travel and said direction of travel to geographical information in a database; and
   identifying a likely mode of travel using said geographical information.

4. The method as recited in claim 1 comprising:
   accessing a plurality of rates of travel and a plurality of directions of travel that are calculated using a plurality of positions and times;
   maintaining an historical record comprising said plurality of rates of travel and said plurality of directions of travel; and
   providing content based on said user-specific information and said historical record.

5. The method as recited in claim 4 comprising sampling said plurality of positions and times at periodic intervals.

6. The method as recited in claim 1 comprising:
   calculating a prospective position for said wireless transceiver device using said rate of travel and said direction of travel; and
   providing content based on said user-specific information and said prospective position.

7. The method as recited in claim 1 wherein said providing content further comprises providing a targeted advertisement relevant to said rate of travel and said direction of travel.

8. The method as recited in claim 1 wherein said user-specific information comprises address book information.

9. The method as recited in claim 1 wherein said user-specific information comprises calendar information.

10. A computer system communicatively coupled to a mobile wireless transceiver device, said computer system comprising:
    a processor coupled; and
    a memory coupled to said processor, said memory comprising instructions that when executed implement a method of targeting services according to information derived from said wireless transceiver device, said method comprising:
       accessing user-specific information resident in said memory; and
       providing content based on said user-specific information, a rate of travel calculated for said wireless transceiver device, and a direction of travel calculated for said wireless transceiver device.

11. The computer system of claim 10 wherein said method comprises:
    identifying a likely mode of transportation using said rate of travel; and
    providing content based on said user-specific information, said direction of travel and said mode of transportation.

12. The computer system of claim 10 wherein said method comprises:
    correlating said rate of travel and said direction of travel to geographical information in a database; and
    identifying a likely mode of travel using said geographical information.

13. The computer system of claim 10 wherein said method comprises:
    accessing a plurality of rates of travel and a plurality of directions of travel that are calculated using a plurality of positions and times;

maintaining an historical record comprising said plurality of rates of travel and said plurality of directions of travel; and providing content based on said user-specific information and said historical record.

14. The computer system of claim 13 wherein said method comprises sampling said plurality of positions and times at periodic intervals.

15. The computer system of claim 10 wherein said method comprises:

calculating a prospective position for said wireless transceiver device using said rate of travel and said direction of travel; and providing content based on said user-specific information and said prospective position.

16. The computer system of claim 10 wherein said providing content comprises providing a targeted advertisement relevant to said rate of travel and said direction of travel.

17. The computer system of claim 10 wherein said user-specific information comprises address book information.

18. The computer system of claim 10 wherein said user-specific information comprises calendar information.

19. A method of targeting services according to information derived from a wireless transceiver device, said method comprising:

accessing rate-based information comprising a rate of travel of said wireless transceiver device;

accessing direction-based information comprising a direction of travel of said wireless transceiver device;

accessing user-specific information resident in a memory unit located on said wireless transceiver device;

identifying a likely mode of transportation using said rate of travel; and sending a message identifying a service appropriate to said user-specific information, said direction of travel and said mode of transportation.

20. The method as recited in claim 19 comprising:

maintaining an historical record for said wireless transceiver device, said historical record comprising said rate-based information and said direction-based information received at different times; and sending a message identifying a service appropriate to said user-specific information, said mode of transportation and said historical record.

21. The method as recited in claim 19 comprising:

calculating a prospective position for said wireless transceiver device using said rate of travel and said direction of travel; and sending a message identifying a service appropriate to said user-specific information, said mode of transportation and said prospective position.

22. The method as recited in claim 19 wherein said identifying a likely mode of transportation comprises using geographical information in a database to identify said likely mode of transportation.

23. The method as recited in claim 19 wherein said user-specific information comprises address book information.

24. The method as recited in claim 19 wherein said user-specific information comprises calendar information.

* * * * *